United States Patent [19]
James et al.

[11] Patent Number: 6,085,977
[45] Date of Patent: Jul. 11, 2000

[54] CHECK PROCESSING PROCEDURE

[75] Inventors: Arthur James, Ithaca; Phillip M. Martinez, Groton; Michael Walls, Ithaca, all of N.Y.; Keith Jentoft, Circle Pines, Minn.

[73] Assignee: Axiohm Tranaction Solutions, Inc., Blue Bell, Pa.

[21] Appl. No.: 08/944,155

[22] Filed: Oct. 6, 1997

[51] Int. Cl.⁷ ...................................................... G06K 7/08
[52] U.S. Cl. .......................... 235/449; 235/379; 235/480; 235/382; 902/22
[58] Field of Search .................................. 235/379, 480, 235/449, 382, 462.08; 902/22

[56] References Cited

U.S. PATENT DOCUMENTS

| | | | |
|---|---|---|---|
| 4,394,092 | 7/1983 | Osmera et al. | |
| 4,541,334 | 9/1985 | Liedtke et al. | 101/93.18 |
| 5,053,607 | 10/1991 | Carlson et al. | 235/379 |
| 5,274,567 | 12/1993 | Kallin et al. | 364/478 |
| 5,367,581 | 11/1994 | Abel et al. | 382/64 |
| 5,371,798 | 12/1994 | McWhortor | 380/51 |
| 5,737,440 | 4/1998 | Kunkler | 382/137 |
| 5,825,946 | 1/1996 | Del Signore, II et al. | 382/320 |
| 5,925,866 | 7/1999 | Yeckley | 235/449 |
| 5,934,193 | 8/1999 | Menzenski | 101/287 |
| 5,997,192 | 12/1999 | Martinez et al. | 400/58 |

OTHER PUBLICATIONS

American National Standard Specifications For Placement and Location of MICR Printing, ANSI X9.13, May 4, 1990, American Bankers Association, Washington, D.C.

Print and Test Specifications for Magnetic Ink Printing (MICR), ANSI X9.27, Dec. 1, 1995, EDI Support Services, Chardon, OH.

Information Processing–Magnetic Ink Character Recognition Print Specifications, ISO. 1004: date, month missing 1995 (E), International.

Organization for Standardization, Geneva, Switzerland date/month/year missing.

*Primary Examiner*—Thien M. Le
*Assistant Examiner*—Daniel S. Felten
*Attorney, Agent, or Firm*—Salzman & Levy

[57] ABSTRACT

A method for using a POS printer that includes means for magnetizing and reading the ON-US and ROUTING information from preprinted magnetic characters on a check. The characters are printed with an ink having magnetizable particles embedded therein. First, the ROUTING and ON-US fields of the check are magnetized, either by a fixed magnet, or within the read head itself. Next, the characters within the ROUTING and ON-US fields are read by the read head, and the signals analyzed by the electronics of the POS printer. This is followed by a verification, in which the printer electronically verifies that the account is not a "bad" account. If the account is good, the printer continues to endorse the check on its back and/or encode the check by printing MICR characters in the AMOUNT field on the face of the check. The POS printer may magnetize and read these characters after they are printed, in order to verify that the correct amount has been encoded onto the check.

17 Claims, 7 Drawing Sheets

CHECK PROCESSING PROCEDURE

FIELD OF THE INVENTION

This invention relates to a new point of sale check processing method and, more particularly, to a new procedure for printing and verifying magnetic ink characters on a check presented for payment at a receipt printing Point of Sale (POS) terminal located at the point of sale.

BACKGROUND OF THE INVENTION

In retail establishments, often the retailer does not have the means to print MICR (Magnetic Ink Character Recognition) characters on a check. In such a case, the retailer typically pays the bank(s) a fee for printing and verifying these characters. In certain situations, however, the retailer purchases an encoding machine to encode the checks. The encoding is performed as a separate task (i.e., at a later time than that of the point of sale). In either case, the subsequent printing of MICR characters on a check is wasteful both in time and in money for the retailer. The present invention suggests that it is more useful to print these characters at the point of sale.

The present invention seeks to provide a new method and apparatus for processing checks at the point of sale.

The invention allows for the printing (encoding) and verifying of magnetic ink characters at the point-of-sale. In particular, this invention provides a Point-of-Sale (POS) printer, allowing the retailer to print MICR characters. (Hereinafter, the word "encode" shall mean "to print magnetic ink characters upon the check.")

This invention allows a retailer to save money and/or time in one of two ways:
1) Having the POS printer of this invention, a retailer can print and verify these characters at the time of sale. This saves the retailer money and saves the banks the time to do so.
2) Retailers having a POS printer need not purchase an encoding machine to encode the checks. Neither do they need to encode the checks as a separate task at a later time than that of the point of sale. The retailer having the POS printer of this invention saves the time and labor in performing this task at the point of sale, and not as a separate function performed at a later time.

The POS printer of this invention generally includes provisions for magnetizing and reading the account and bank information from the existing magnetic characters on the check. The encoding module prints the characters according to ANSI[1], ISO[2], or other standards using an ink having magnetizable particles embedded therein. The POS printer may magnetize and read these characters after they are printed, in order to verify that the correct characters have been encoded onto the check. The printer may comprise a magnet to magnetize the characters; a read head to generate waveform signals from the magnetized characters and electronics to analyze the signal waveform from each character; and a print mechanism with the capability of using magnetic ink for printing the characters. Certain read heads, such as DC-biased read heads, do not require a magnet to pre-magnetize the characters. In such cases, only a DC-biased read head and the associated electronics need be supplied.

SUMMARY OF THE INVENTION

In accordance with the present invention, there is provided a method that uses a POS printer that includes means for magnetizing and reading the ACCOUNT and ROUTING information from preprinted magnetic characters on a check. The encoding module prints the characters in the AMOUNT field of the check, according to ANSI[1], ISO[2], or other standards. The characters are printed with an ink having magnetizable particles embedded therein. The POS printer may magnetize and read these characters after they are printed, in order to verify that the correct amount has been encoded onto the check. The printer may also comprise a magnet to magnetize the characters; a read head to generate signal waveforms from each character and electronic circuitry to analyze the signal waveform from each character; and a print mechanism with the capability of using magnetic ink for printing the characters. Currently, the AMOUNT field is printed by the retailer or the customer's bank after the purchase transaction occurs. The encoding module of the POS printer allows for the customer's check to have the AMOUNT field printed and verified, while the customer is still at the point of sale.

Checks currently presented at the point of sale are placed faced down in the receiving slot of the POS terminal. The main feed rollers engage and the check is positioned for MICR reading. The ON-US and ROUTING fields are then read. The check is held by the machine until the account number has been checked against a list of "bad" accounts, and then it may be endorsed. Check processing is finished after the endorsement step.

The method of the invention comprises a subsequent encoding step. A certain sequence of actions is performed in order to accomplish the encoding and verification of the check at the point of sale. First, the ROUTING and ON-US fields of the check are magnetized, either by a fixed magnet, or within the read head itself. Next, the characters within the ROUTING and ON-US fields are read by the read head, and the signals analyzed by the electronics of the POS printer. This is followed by a verification, in which the account number is checked, usually by the POS controller, against a list of known "bad" account numbers. If the account number is not "bad", the printer continues to endorse the check on its back and/or encode the check by printing MICR characters in the AMOUNT field on the face of the check.

The check is subsequently encoded by feeding it, via main feed rollers (driven by a motor), towards a sensor disposed in the check feed path. After passing the sensor, the check travels towards a print platen downstream from the sensor. The check is delivered to the printing platen. The motor is then disengaged. The sensor triggers a second motor that drives a camming gear, which in turn lowers a thermal print head against the check, which is now disposed upon the print platen. Heaters for the thermal printer begin to actuate once the check passes the sensor. The second motor turns counterclockwise to lift a toggle arm off of the camming gear and to engage the platen gear. A ribbon take-up spool is driven by the platen gear. After all twelve MICR characters are printed upon the check, the thermal head stops firing and the platen stops turning. The main feed rollers are then re-engaged. The second motor then reverses direction and engages the camming gear that lifts the thermal print head away from the check and platen. A read head solenoid is actuated and presses the check against the read head in order to read the MICR characters that have just been printed. The main feed rollers concurrently pull the check over the read head to perform the read. After the read, the read head solenoid is deactuated. The main feed rollers are then reversed, and the check is presented to the personnel at the register.

It is an object of this invention to provide an improved point of sale printer and method.

It is another object of the invention to provide a point of sale printer and method for encoding and verifying MICR characters upon a check.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, the invention features a new printer and method for negotiating transactions at the point of sale in retail establishments. The POS printer includes means for magnetizing and reading the ON-US and ROUTING fields from pre-printed magnetic characters on a check. The encoding module prints the characters in the AMOUNT field of the check, according to ANSI[1], ISO[2], or other standards. For purposes of clarity and brevity, like elements and components will bear the same number throughout the figures.

Figure 1:
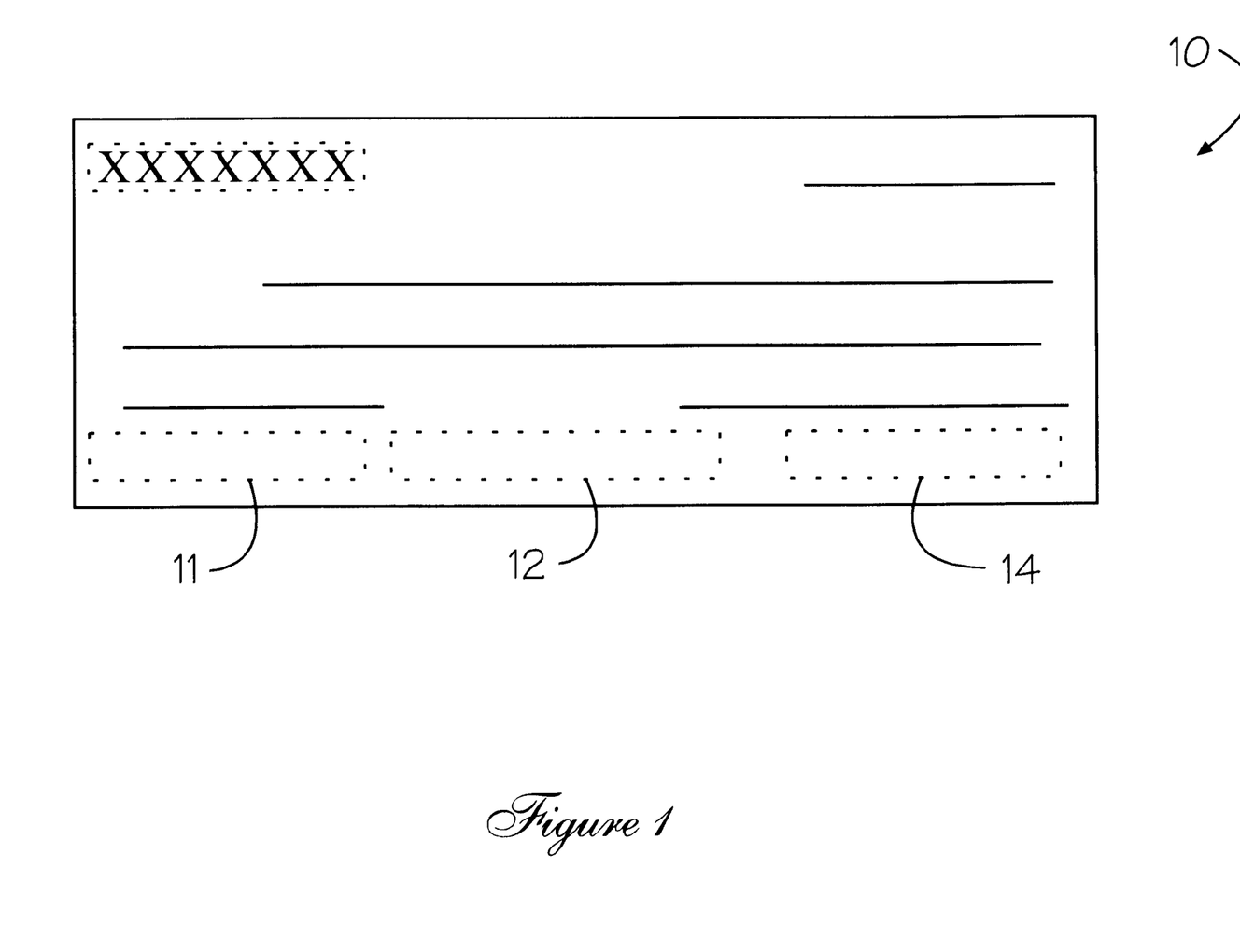
FIG. 1 illustrates a plan view of a typical personal check used at a point of sale transaction.

Now referring to FIG. 1, a typical personal check 10 is shown in plan view. The exact location of various fields of check 10 is defined in the ANSI[1] and ISO[2] specifications. The ROUTING and ON-US fields 11 and 12, respectively, convey the bank and account information of the customer's check. These fields are already printed with MICR-readable characters when a customer begins a transaction. Currently, the AMOUNT field 14 is printed by the retailer or the customer's bank after the purchase transaction has occurred.

The encoding module 21 of a POS printer 20 is described hereinafter with reference to FIGS. 4 through 7. The encoding module 21 allows for the customer's check 10 to have the AMOUNT field 14 printed and verified while the customer is still at the point of sale. The POS printer 20 must follow a certain sequence of actions for the sales transaction to be negotiated.

The POS printer 20 must first magnetize the ROUTING and ON-US fields 11 and 12, respectively. This can be accomplished either by a fixed magnet or within the read head 22 itself. Next, the characters within the ROUTING and ON-US fields 11 and 12 are read by the read head 22 and the signals analyzed by electronics (not shown) of the POS printer 20. This analysis is followed by a verification step, wherein the printer 20 or a POS controller, not shown, attached to printer 20 determines whether the account number is on a list of known "bad" accounts. If the account number is not on the "bad" account list, the printer may endorse the check on its back, and/or encode the check by printing MICR characters in the AMOUNT field on the face of the check. Check encoding can be effected by utilizing a thermal transfer print mechanism. Thermal transfer printing can be either in parallel (full line) or in serial (one character at a time). For reasons of simplicity, the printer is preferred to contain a serial thermal transfer print mechanism that provides MICR characters. Once the check 10 is encoded, the POS printer 20 verifies that the characters are readable by magnetizing and reading the encoded characters. The signals can then be analyzed and compared to the original transaction amount.

In the event that the reading of the encoded amount does not correspond to the transaction amount, the retailer may attempt to use the POS printer 20 to reread the encoded amount during the transaction or at a later time. In some cases, it may be necessary for the retailer or bank to add a strip of paper, not shown, along the bottom of the check and reprint the MICR characters for all of the fields (ROUTING field 11, ON-US field 12, and AMOUNT field 14). Since the POS printer 20 can print and read MICR characters, the potential also exists for the printer to be used to reprint the ROUTING, ON-US, and AMOUNT fields 11, 12 and 14, respectively, either at the point of sale or at a later time as a second, independent operation.

Figure 2:
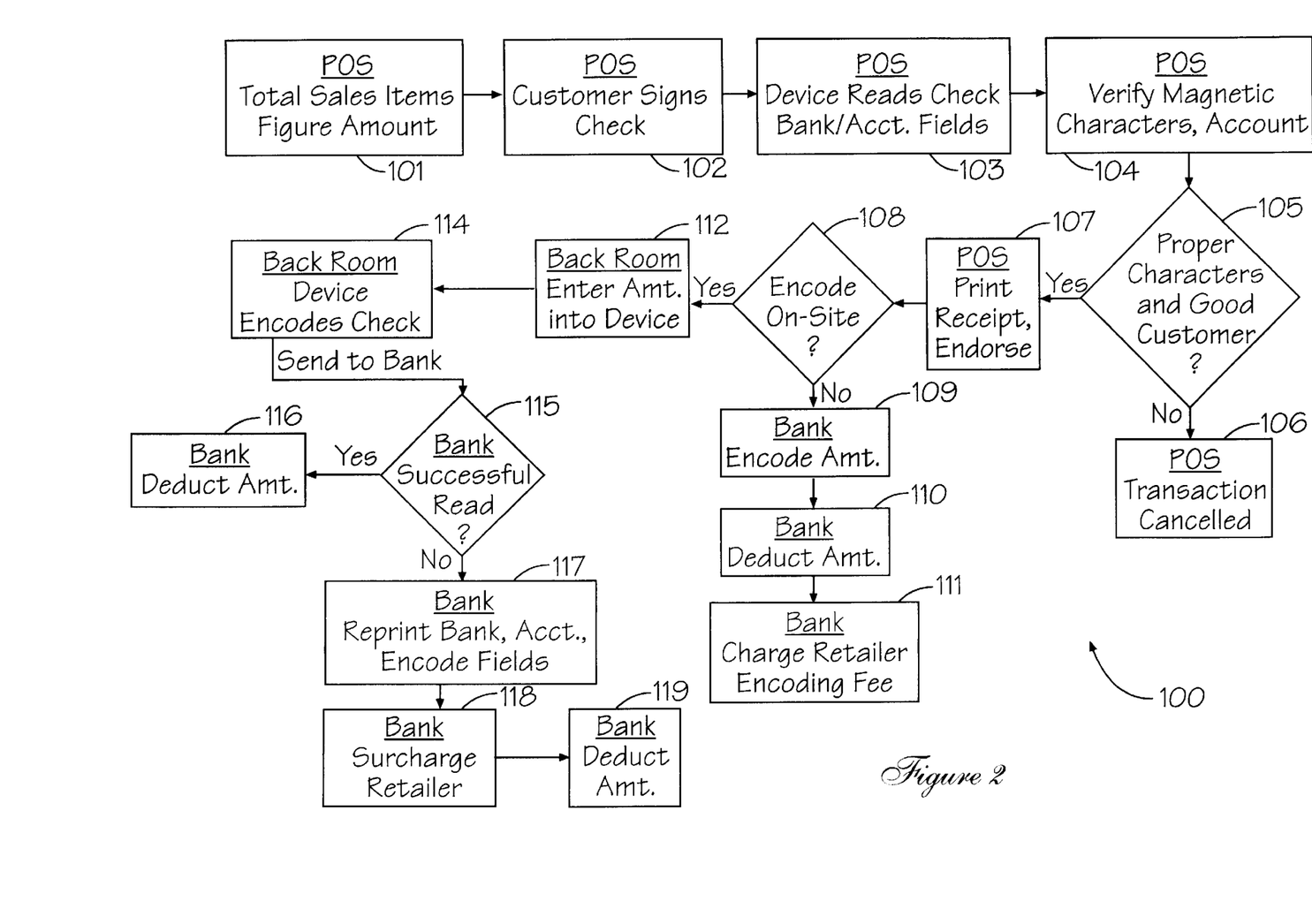
FIG. 2 depicts a flow diagram of a current check processing method.
Figure 3:
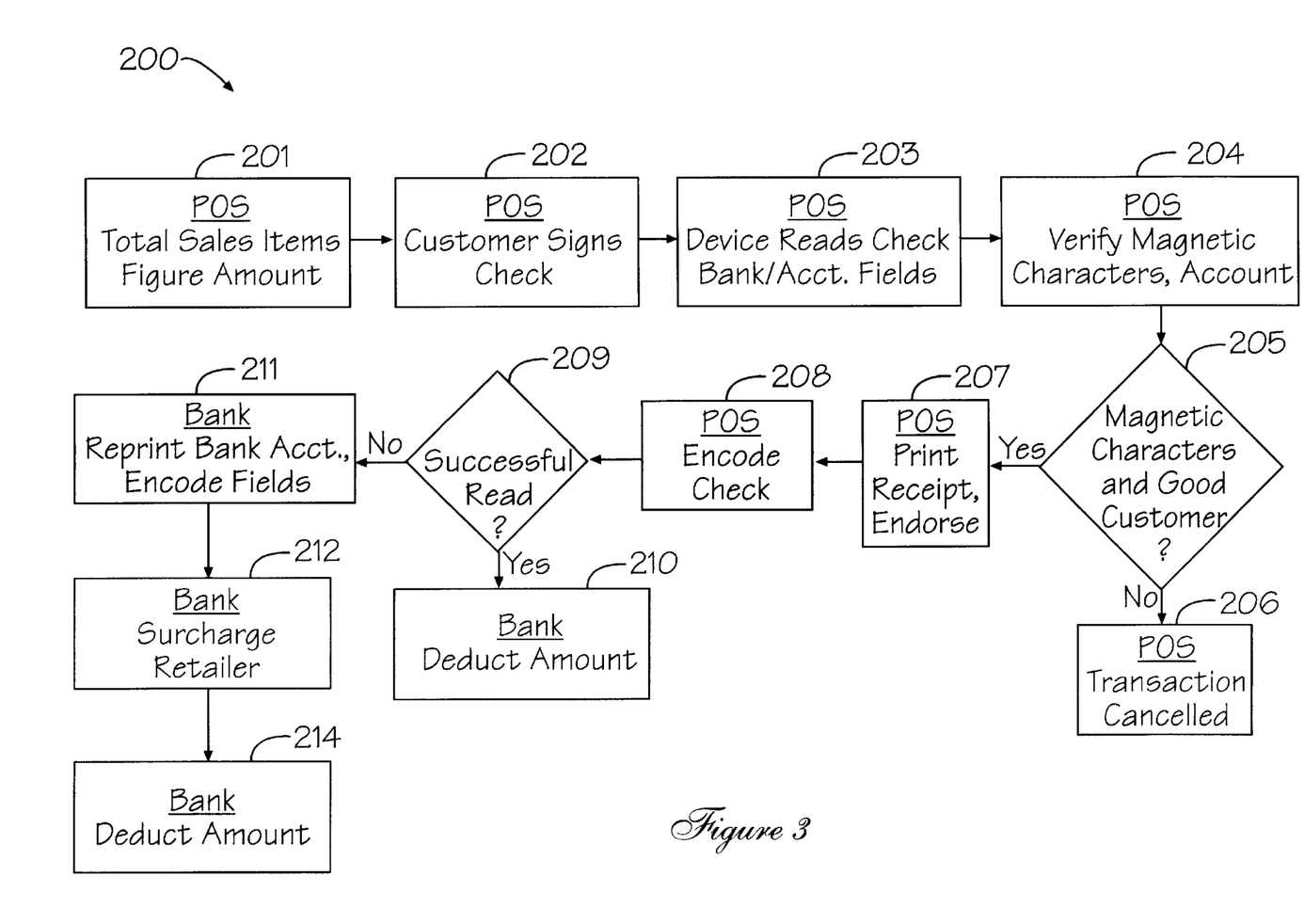
FIG. 3 shows a revised check processing method in accordance with the present invention.

Referring to FIGS. 2 and 3, flowcharts 100 and 200, respectively, demonstrate both the present and the improved check handling sequence which the inventive POS encoding provides. The basic improvement is realized when the retailer or bank is not required to re-enter the AMOUNT field on the check 10 in order to encode same.

Flowchart 100 depicts the current procedure. At the point of sale, the sales items are totalled and a figure amount of the transaction is provided, step 101. The customer then provides a personal check and signs same, step 102. A device may then read the check, step 103, and verify whether the account is a good account, step 104. If the check 10 is drawn on a bad account, or proper fields or characters are missing, step 105, the transaction is canceled, step 106. If the transaction is in order (i.e., the account is good and the necessary MICR characters are both present and readable), step 107, the check 10 is endorsed, and a customer receipt is printed. If the retail establishment does not have an encoding machine in its back room, step 108, then the check 10 is sent to the bank for encoding, step 109. The bank deducts the amount of the transaction from the account of the customer, step 110. The bank may then charge the retailer an encoding fee, step 111.

When the retailer has its own encoding equipment, the check 10 is sent to a remote location, (e.g., a "back room"), where the amount is entered onto the check 10, step 112. The check is then encoded, step 114, and then sent to the bank. If the bank can successfully read the encoding, step 115, it deducts the transaction amount from the account of the customer, step 116. When the bank cannot decipher the encoding, step 115, the bank reprints the check 10 with newly encoded fields, step 117. The bank then exacts a surcharge from the retailer, step 118, and deducts the amount of the transaction from the customer's account, step 119.

Referring to FIG. 3, a flow chart 200 illustrates the new transaction procedure in accordance with the invention. At the point of sale, the sales items are totalled and a figure representing the total amount of the transaction is provided, step 201. The customer then provides a personal check and signs same, step 202. A device then reads the check, step 203, and verifies whether the account is a good account, step 204. If the account is "bad", or the proper fields or characters are not present, step 205, the transaction is canceled, step 206. If the transaction is in order, however, step 205, the check 10 may be endorsed and a customer receipt is printed, step 207. The POS printer 20 then encodes the check 10 with the AMOUNT field, step 208.

If the bank can successfully read the AMOUNT field on check 10, step 209, then the transaction amount is deducted from the customer's account, step 210. When the bank cannot decipher the check 10, step 209, then it reprints the check and encodes the necessary fields, step 211. The bank then exacts a surcharge from the retailer, step 212, and deducts the transaction amount from the customer's account, step 214.

The proposed invention can be embodied in several ways at the point of sale. The preferred method depicted in flow chart 200 requires that MICR characters be printed serially using a thermal transfer ribbon 23. In the serial method, the printhead heating elements print a vertical column of dots at each printing station, as the head is moved horizontally along the longest edge of the check 10. A mechanism has already been disclosed for a parallel technique of encoding checks. Three embodiments are shown in FIGS. 4 through 7, in which address serial encoding of checks is accomplished at the point of sale.

Figure 4:
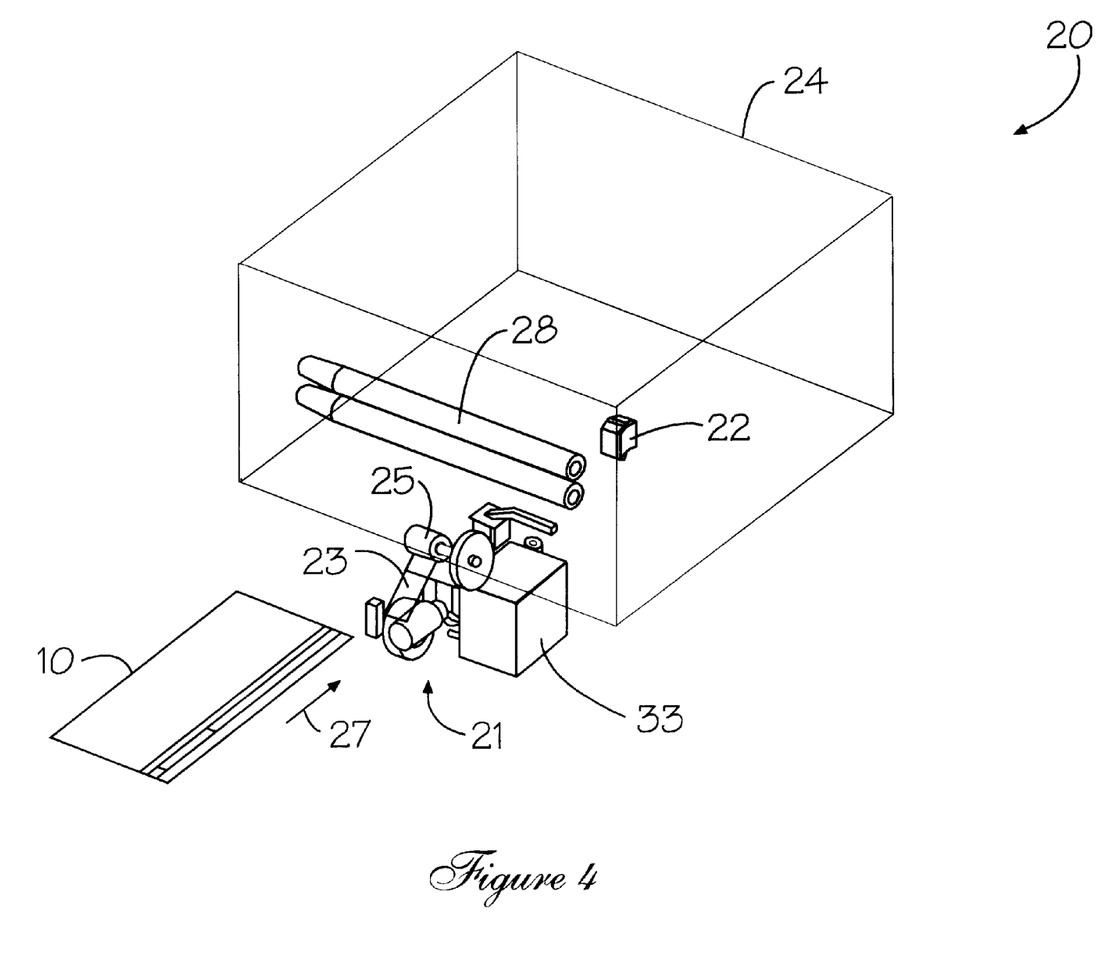
FIG. 4 illustrates a perspective view of a schematic embodiment of a point of sale machine, in accordance with the current invention.

The first embodiment for a POS encoding device would be useful as an enhancement to an existing POS printer/check processor. This embodiment is shown in FIG. 4. A typical POS printer 20 has an MICR read head 22 for reading the account and bank information of checks being processed. The housing of the machine is shown in schematic outline 24. The encoding mechanism would be in the front of the machine and would utilize either a main feed roll system or an auxiliary feed roll system (not shown) within the encode mechanism 21.

Figure 5:
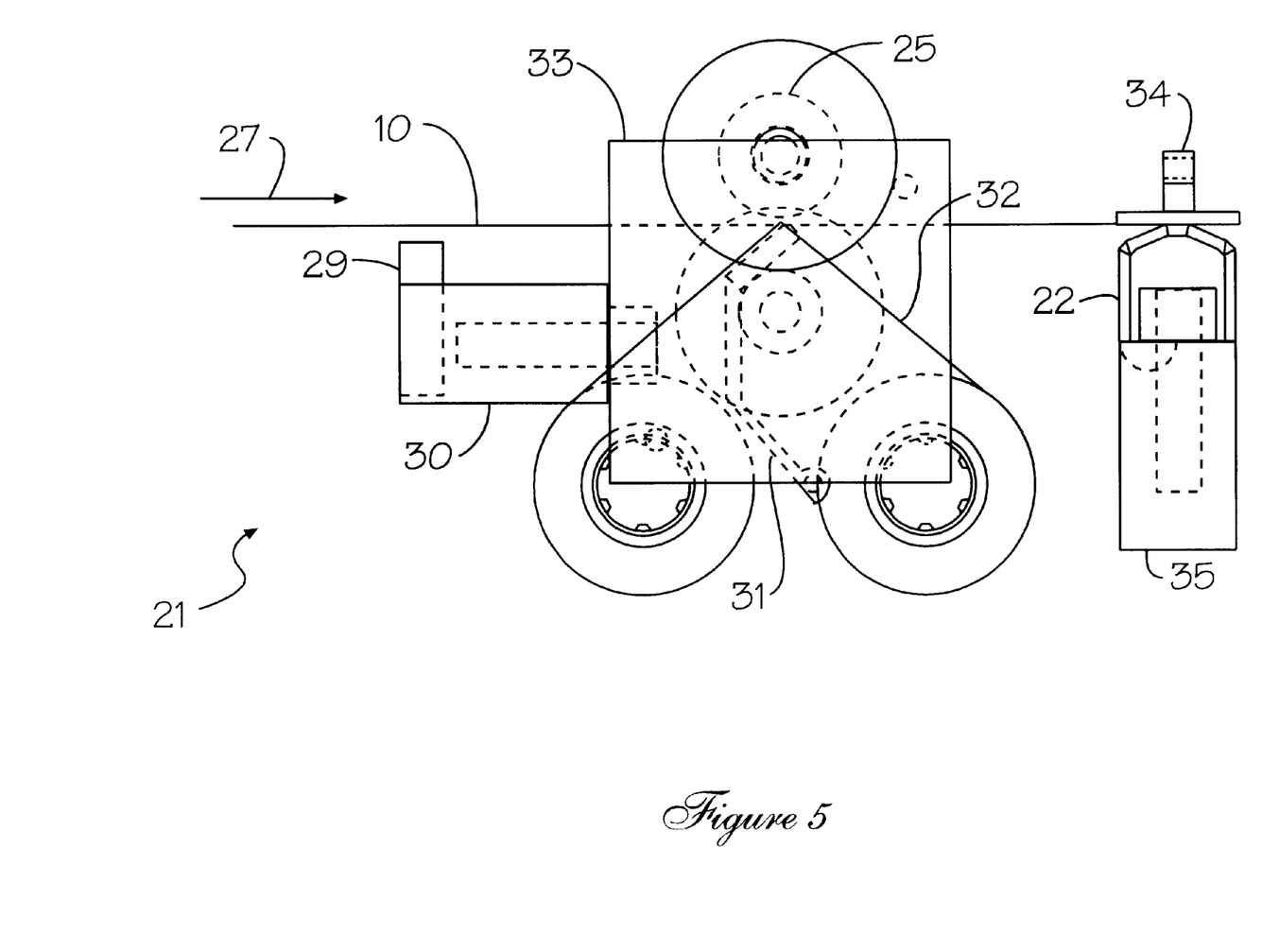
FIG. 5 depicts a side view of the point of sale mechanism shown in FIG. 4.

Referring to FIG. 5, the mechanism 21 of FIG. 4 is shown in greater detail. The mechanism 21 uses the print platen 25 to advance the check 10 during the encoding of the check. In the orientation of the read heads of FIG. 4, the check 10 would be placed face down and driven by the feed rollers 28 into machine 20 in the direction of the arrow 27, in order to read the ON-US and ROUTING information. The POS machine would then activate read head 22 to verify the account. Afterwards, the check 10 would be driven back out into the encode mechanism 21 by the main feed rollers 28 until a sensor 29 is tripped. The main feed rollers 28 may continue to drive the check 10 a given distance past the sensor 29. Then, the printhead solenoid 30 would allow the printhead 31 to push the check 10 against the platen 25. Subsequently, the main feed rollers 28 would release the check 10. In this position, the thermal transfer ribbon 32 is sandwiched between the printhead 31 and the check 10. The check 10 would then be driven forward by the platen 25, which is geared back to the platen motor 33. This action also advances the ribbon 32. Once the sensor 29 is tripped again, some amount of motor steps can be counted to detect the position of the check. When the check is correctly positioned, printhead heaters would be turned on to create the characters on the check, as it is driven forward into the machine 20. When the printing cycle is finished, the main feed rollers 28 would engage the check 10 again, and the printhead solenoid 30 would drop the printhead 31. Another solenoid 35 would activate the pad/arm 34 against read head 22 to press the check 10 against the read head 22. The check would then be driven into the machine 20, whereby read head 22 would verify that the printed MICR characters are equivalent to the amount of sale. After the encoding process is finished, the POS printer 20 may continue to perform other functions on the check, such as printing on the check face or endorsing the check on its back.

Figure 6:
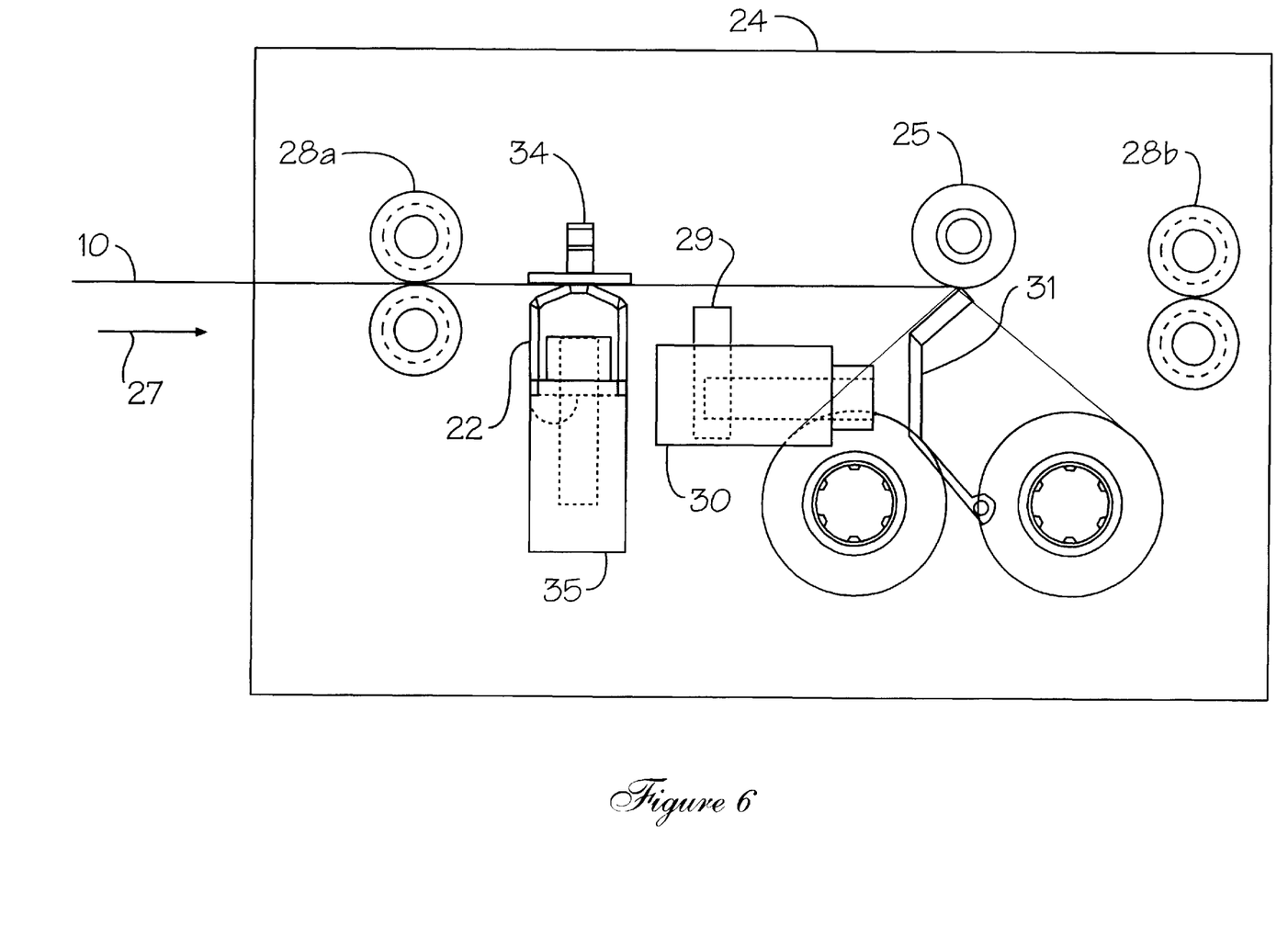
FIG. 6 shows a side view of a second embodiment of a point of sale mechanism.

Referring to FIG. 6, a side view of a machine 20 is shown. This is a second embodiment for a POS encoding device 20 featuring an encoding mechanism 21 that is internal within the housing 24 of the machine 20. This is the preferred embodiment, since it tends to keep the size of the POS machine and the number of parts to a minimum. In this embodiment, the check 10 is driven by two sets of feed rollers 28a and 28b, respectively. The rollers 28a and 28b are coupled to each other (not shown). The left-hand side represents the front of the machine. The forward set of feed rollers 28a (lefthand side) drives the check (arrow 27) into the machine 20, and the ROUTING and ON-US fields 11 and 12, respectively, are read by the read head 22. Once the check 10 has been verified, the check 10 is driven further, and the rear set of feed rollers 28b grips the check and drives it until the trailing edge of the check 10 is past the sensor 29. At this point, the feed rollers 28 position the check 10 to the first printing position. A printhead solenoid 30 can then activate the printhead 31 against the platen 25.

In contrast to the first embodiment, where a separate motor was described for driving the platen 25, the existing feed roller system can be used to drive the check 10 (and ribbon 23) during the encode process. Once encoding has been completed, the check 10 is driven back past the sensor 29, and the feed rollers 28 can then position the check 10 to be read by read head 22. The pad/arm solenoid 35 then activates the pad/arm 34, and the check 10 is driven to verify the encoded amount. After the read, the pad/arm 34 is released and the POS machine continues to perform other functions.

The aforementioned embodiments described herein have assumed that the check 10 is face-down in the machine 20, and that the read head 22 is stationary. These embodiments can also easily accommodate a check that is face-up, and can utilize a dynamic read head.

Figure 7:
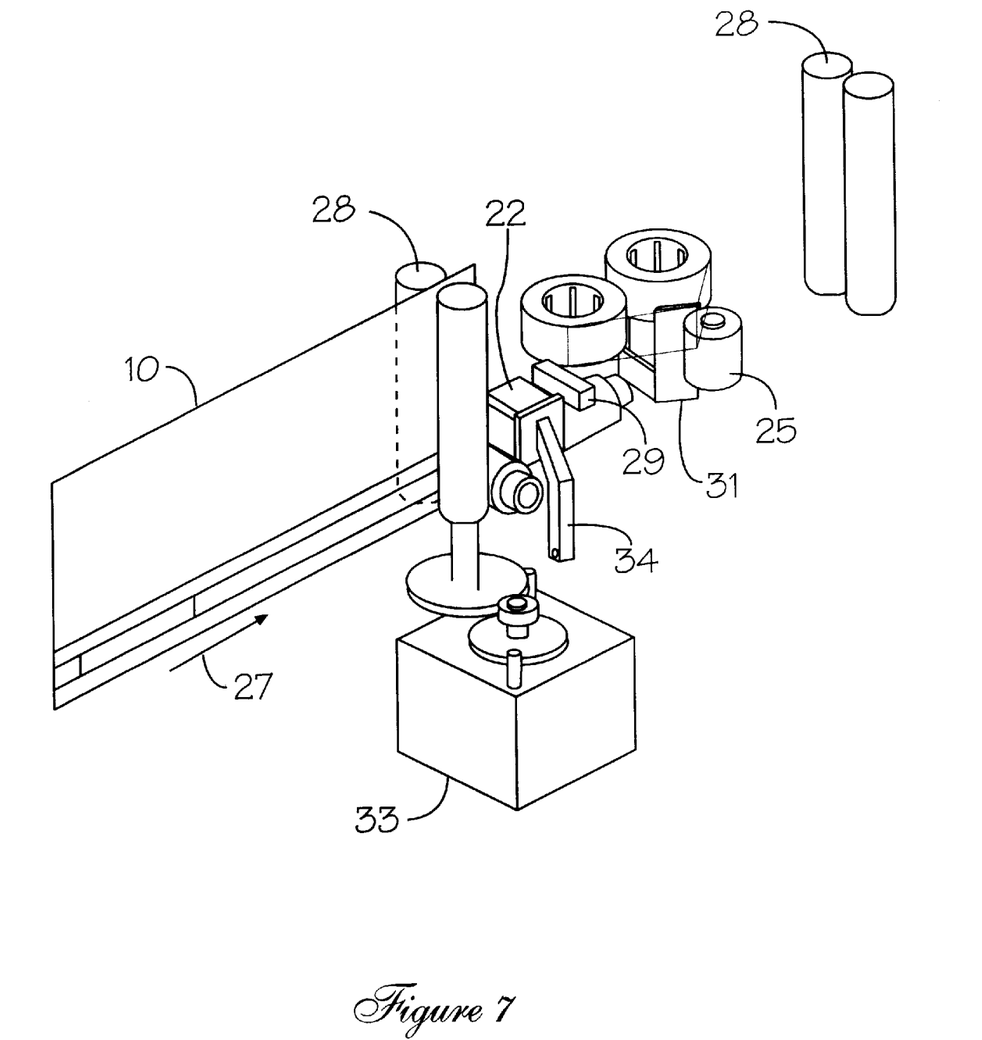
FIG. 7 illustrates a side view of a third embodiment of a point of sale mechanism.

Referring to FIG. 7, a third embodiment is illustrated for the point of sale encoding device 21 of this invention. The encoding device 21 has a separate module that is distinctly apart from the POS printer 20. In such an embodiment, a communication line to the POS printer would be required. The device would still accomplish the same functions: read the ROUTING and ON-US fields 11 and 12, respectively; verify the bank and account information through the communication line; encode the check 10; and read the encoded amount as a final verification. This mechanism and its operations are essentially the same as that of the second embodiment, shown in FIG. 6, with the exception that the components would be external to the machine. Note that the mechanism is depicted in a vertical arrangement. A separate motor 38 would be required for driving the feed rollers 28. A belt between the sets of feed rollers is not shown.

As can be observed from the foregoing description, this invention proposes that a point of sale printer can be used to print, verify, and encode MICR characters on checks. The primary application of this invention is for checks to be encoded directly at the point of sale in order to save retailers time and money. The three embodiments allow for an encoding module to be implemented on the front of a POS printer, internal to the POS printer, or as a separate module to the printer.

REFERENCES

1. Print and Test Specifications for Magnetic Ink Printing (MICR), ANSI X9.27, 1995, EDI Support Services, Chardon, Ohio.

2. Information Processing—Magnetic Ink Character Recognition—Print Specifications, ISO 1004: 1995(E), International Organization for Standardization, Geneva, Switzerland.
3. American National Standard Specifications For Placement and Location of MICR Printing, ANSI X9.13, 1990, American Bankers Association, Washington, D.C.
4. Method and Apparatus for High Speed Thermal Printing, Osmera et al., U.S. Pat. No. 4,394,092, 1983.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method of accomplishing and completing a transaction at a point of sale, comprising the steps of:
    a) encoding MICR characters upon a check at a point-of-sale;
    b) magnetizing said encoded MICR characters; and
    c) reading and analyzing said encoded MICR characters.

2. The method of accomplishing and completing a transaction at a point of sale in accordance with claim 1, further comprising the step of:
    d) endorsing said check.

3. The method of accomplishing and completing a transaction at a point of sale in accordance with claim 1, wherein said encoding step (a), further comprises the step of:
    e) printing MICR characters in said AMOUNT field of the check.

4. The method of accomplishing and completing a transaction at a point of sale in accordance with claim 1, wherein said check encoding step (a) includes the step of:
    e) utilizing thermal transfer printing.

5. The method of accomplishing and completing a transaction at a point of sale in accordance with claim 4, wherein said thermal transfer printing is parallel (full line) printing.

6. The method of accomplishing and completing a transaction at a point of sale in accordance with claim 4, wherein said thermal transfer printing is serial (one character at a time) printing.

7. The method of accomplishing and completing a transaction at a point of sale in accordance with claim 1, wherein said reading and analyzing step (c), further comprises the step of:
    d) electronically accessing a database.

8. The method of accomplishing and completing a transaction at a point of sale in accordance with claim 1, further comprising the step of:
    d) determining whether said encoding step (a) is to be performed on site or at a remote location.

9. A method of using a Point of Sale (POS) printer to encode MICR characters on a customer check, said printer comprising means for magnetizing and reading preprinted magnetic characters disposed on a check, said encoding module having means for printing characters, using a magnetic ink, according to a standard, said POS printer magnetizing and reading said characters in order to verify that a correct amount has been encoded onto said check, the steps comprising:
    a) encoding characters upon a check at a point-of-sale;
    b) magnetizing said encoded characters; and
    c) reading and analyzing said encoded characters.

10. The method in accordance with claim 9, wherein said encoding module further comprises:
    means for magnetizing said characters; and
    a read head for reading and analyzing each character.

11. The POS printer in accordance with claim 9, wherein said means for printing includes a mechanism for using said magnetic ink to print said characters.

12. The method in accordance with claim 9, wherein said encoding module further comprises:
    a DC-biased read head for reading and analyzing a signal waveform provided by each character; and wherein
    said means for printing includes a mechanism using magnetic ink for printing the characters.

13. The method in accordance with claim 9, wherein said encoding module encodes using an ANSI standard.

14. The POS printer in accordance with claim 9, wherein said encoding module encodes using an ISO standard.

15. The POS printer in accordance with claim 9, wherein said means for printing has a front end, and said encoding module is disposed thereon.

16. The POS printer in accordance with claim 9, wherein said encoding module is disposed internally within said means for printing.

17. The POS printer in accordance with claim 9, wherein said encoding module includes a separate module to said means for printing.

* * * * *